(12) United States Patent
Weiberle et al.

(10) Patent No.: US 9,631,918 B2
(45) Date of Patent: Apr. 25, 2017

(54) SENSOR DEVICE FOR A PEDAL, AND A METHOD FOR PROVIDING INFORMATION REGARDING AN OPERATION OF A PEDAL

(75) Inventors: Reinhard Weiberle, Vaihingen/Enz (DE); Frank Hassdenteufel, Leonberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 377 days.

(21) Appl. No.: 13/808,528

(22) PCT Filed: May 11, 2011

(86) PCT No.: PCT/EP2011/057616
§ 371 (c)(1),
(2), (4) Date: Mar. 12, 2013

(87) PCT Pub. No.: WO2012/004030
PCT Pub. Date: Jan. 12, 2012

(65) Prior Publication Data
US 2013/0186221 A1 Jul. 25, 2013

(30) Foreign Application Priority Data
Jul. 7, 2010 (DE) .................... 10 2010 031 063

(51) Int. Cl.
*G01B 7/00* (2006.01)
*B60T 7/04* (2006.01)
(Continued)

(52) U.S. Cl.
CPC .............. *G01B 7/003* (2013.01); *B60T 7/042* (2013.01); *B60T 7/06* (2013.01); *B60T 11/18* (2013.01);
(Continued)

(58) Field of Classification Search
CPC . G01B 7/003; B60T 7/06; B60T 7/042; B60T 11/18; F16H 21/44; Y10T 74/18928
(Continued)

(56) References Cited

U.S. PATENT DOCUMENTS 6,474,753 B1 * 11/2002 Rieth et al. ................... 303/191
6,896,337 B1 * 5/2005 Backhus et al. ........... 303/114.3
(Continued)

FOREIGN PATENT DOCUMENTS

| CN | 1702427 | 11/2005 |
|----|---------|---------|
| CN | 2885713 | 4/2007 |

(Continued)

OTHER PUBLICATIONS

International Search Report, PCT International Application No. PCT/EP2011/057616, dated Nov. 3, 2011.

*Primary Examiner* — Thomas J Williams
*Assistant Examiner* — Mariano Sy
(74) *Attorney, Agent, or Firm* — Gerard Messina

(57) ABSTRACT

A sensor device for a pedal which is set up to determine at least one actuating variable regarding an operation of the pedal by a user of a device which is actuable by means of the pedal, and to output information corresponding to the at least one determined actuating variable, the sensor device additionally being set up to determine as the at least one actuating variable, at least one variable regarding a position and/or a change in position of an input rod disposed on the pedal, which is able to be set into at least a rotary motion by operating the pedal, in relation to a specified spatial direction. Furthermore, a method for providing information regarding an operation of a pedal is described.

11 Claims, 3 Drawing Sheets

(51) Int. Cl.
*B60T 11/18* (2006.01)
*B60T 7/06* (2006.01)
*F16H 21/44* (2006.01)

(52) U.S. Cl.
CPC ........ *F16H 21/44* (2013.01); *Y10T 74/18928* (2015.01)

(58) Field of Classification Search
USPC ................. 188/1.52, 1.11 E, 382; 303/114.3, 303/122.11; 73/132; 74/512, 513, 514
See application file for complete search history.

(56) References Cited

U.S. PATENT DOCUMENTS

| | | | |
|---|---|---|---|
| 2002/0117893 | A1* | 8/2002 | Shaw et al. ................. 303/113.4 |
| 2006/0163941 | A1* | 7/2006 | Von Hayn et al. ........... 303/155 |
| 2006/0214504 | A1* | 9/2006 | Kusano ..................... 303/113.4 |
| 2007/0159001 | A1* | 7/2007 | Miyazaki et al. ......... 303/113.4 |
| 2008/0230328 | A1* | 9/2008 | Lacroix et al. .......... 188/1.11 E |
| 2011/0254357 | A1* | 10/2011 | Vollert et al. ..................... 303/3 |

FOREIGN PATENT DOCUMENTS

| | | |
|---|---|---|
| CN | 101920659 | 12/2010 |
| DE | 101 18 436 | 10/2002 |
| DE | 10 2005 024 577 | 11/2006 |
| JP | 60-164230 | 10/1985 |
| JP | 1-135519 | 9/1989 |
| WO | WO 2010/069679 | 6/2010 |

\* cited by examiner

SENSOR DEVICE FOR A PEDAL, AND A METHOD FOR PROVIDING INFORMATION REGARDING AN OPERATION OF A PEDAL

FIELD OF THE INVENTION

The present invention relates to a sensor device for a pedal. Furthermore, the present invention relates to a method for providing information regarding a pedal operation.

BACKGROUND INFORMATION

A device and a method for electromechanical brake boosting are described in German Patent Application No. DE 10 2005 024 577 A1. In this device and the corresponding method, a force a driver is exerting on a brake pedal is measured using a force sensor installed on the brake pedal. Subsequently, a servo motor of a brake booster is used to apply a boost force that corresponds to the measured force on a driver, which is mounted on the spindle screw running from the brake pedal to the brake master cylinder. In this way, it is to be ensured that an electromechanical brake boost is provided to a driver during a deceleration of his vehicle.

SUMMARY

The present invention provides an example sensor device for a pedal, and an example method for supplying information regarding an operation of a pedal.

When using the example sensor device according to the present invention or when executing the corresponding example method, there is no need to install of force sensor on a pedal to measure an actuating force exerted on the pedal. Since the mounting of such a force sensor that is in direct contact with the pedal causes relatively high expense, production costs of a device able to be actuated by a pedal, such as for a vehicle-internal brake system having a brake pedal, are able to be saved when using the technology according to the present invention.

It is likewise possible to dispense with a conventional sensor for the (direct) measurement of an angle of rotation of a pedal when using the example sensor device according to the present invention and the corresponding example method. Since a conventional sensor for measuring an angle of rotation of the pedal normally should have a measurable/detectable angular range of approximately 45°, its production is relatively expensive. Moreover, when using the technology according to the present invention, the relatively great outlay which normally has to be incurred when equipping a new pedal type with a standard sensor for measuring an angle of rotation of the pedal, is dispensed with. As a result, the example sensor device according to the present invention and the corresponding example method are cost-effective alternatives to a conventional sensor for the (direct) measurement of an angle of rotation of a pedal.

In addition, in contrast to measuring an angle of rotation of a pedal, the technology according to the present invention is able to be executed despite the fact that the sensor device is not mounted in the immediate vicinity of the pedal, especially in the interior of the vehicle. For example, this eliminates the risk that the driver will be injured by a sensor for measuring the angle of rotation of the brake pedal which is at least partially installed in the interior of the vehicle.

The example sensor device according to the present invention and the corresponding example method are able to be realized with the aid of a single, cost-effective sensor, such as a Hall-effect sensor, a GMR sensor, or an AMR sensor. No expensive electronic system is required to analyze the information provided by such a sensor. Furthermore, such a sensor requires relatively little installation space.

The present invention therefore facilitates the integration of systems that are controllable by way of a pedal, such as a brake system controllable by pedal, into a vehicle.

The example sensor device is designed to detect a position and/or a change in position of the input rod, set into rotary motion, in relation to a predefined spatial direction. The method of functioning of the sensor device may also be defined to the effect that the sensor device makes it possible to detect at least one variable regarding a distance, a change in distance, an orientation and/or a change in orientation of the input rod set into rotary motion, in relation to the predefined spatial direction.

The sensor device in particular may be set up to determine the at least one ascertainable variable via a contactless reciprocal effect. The contactless reciprocal effect, for instance, may denote a reciprocal effect between a magnetic field and/or an electric field of a component encompassed by the input rod, and the sensor device. In the same way, a stationary magnetic field and/or a stationary electrical field may interact with the sensor device affixed on the input rod, which is able to be set into rotary motion together with the input rod when the pedal is operated.

Furthermore, the sensor device may also include an optical detector, with whose aid an impingement position of a light beam reflected at the input rod is able to be verified. In the same way, it is also possible that the detector is fixedly mounted on the input rod in order to determine an impingement position of a light beam reflected at a stationary reflector. In both capes the evaluation device preferably is set up to determine/specify the orientation and/or the change in orientation of the input rod in relation to the specified spatial direction, based on the ascertained impingement position. However, the potential implementations for the sensor device are not limited to the examples enumerated here.

The description above regarding the example sensor device made in the previous paragraphs correspondingly also apply to a transformer equipped therewith, to a brake system equipped therewith, and to the example method according to the present invention.

BRIEF DESCRIPTION OF THE DRAWINGS

Additional features and advantages of the present invention are described below, with reference to the figures.

DETAILED DESCRIPTION OF EXAMPLE EMBODIMENTS

Figure 1:
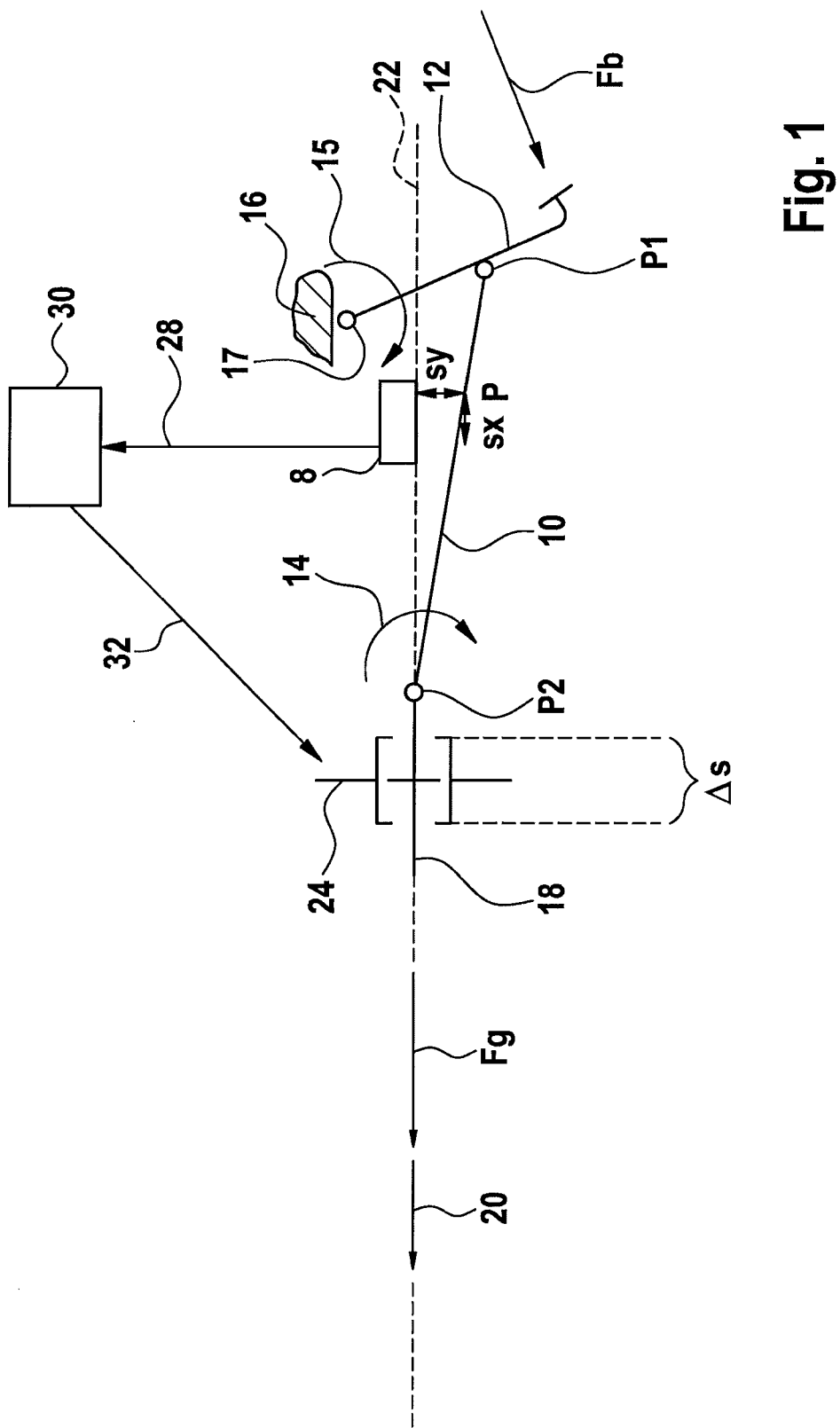
FIG. 1 shows a schematic representation of a first specific embodiment of the sensor device.

FIG. 1 shows a schematic representation of a first specific embodiment of the sensor device.

The rotation-translation converter shown in FIG. 1 together with sensor device 8 has an input rod 10, which is able to be fixed in place, or which is fixed in place, on a pedal 12 in such a way that when pedal 12 is operated, input rod 10 is at least able to be set into a rotary motion, which is schematically represented by arrow 14. Input rod 10 is mountable or mounted on a first end P1 on pedal 12, for instance, in such a way that the operation of pedal 12 causes input rod 10 to be set into a motion having a rotation component (rotary component), in particular about a second end P2 of input rod 10. In addition, the movement into which input rod 10 is able to be set may also include a translatory component. Point P2 preferably is adjusted along a straight line in such a movement. In an advantageous manner, input rod 10 is present in an initial position when pedal 12 is not operated.

Pedal 12, which is able to be used together with the rotation-translation converter, preferably is designed in such a way that when operated, it is able to be set into at least a rotary motion in relation to a stationary anchoring 16, the rotary motion being schematically indicated by arrow 15. It is possible, in particular, that the rotary motion schematically represented by arrow 15 is directed about an anchoring point 17 of pedal 12. Pedal 12 is implementable as brake pedal of a vehicle, in particular. However, the use of sensor device 8 described here is not limited to a reciprocal action with a brake pedal. For example, it is also possible to use the sensor device in conjunction with a clutch pedal of a vehicle.

The rotation-translation converter also has an output rod 18, which is connected to input rod 10 in such a way that output rod 18 is able to be set at least into a translatory motion, schematically represented by arrow 20, by means of input rod 10 set into rotary motion. Preferably, output rod 18 is displaced by an adjustment travel along center longitudinal axis 22 running through output rod 18, by means of the input rod set into at least the rotary motion. The motion into which output rod 18 is able to be set by means of input rod 10 moving along with pedal 12 may also incorporate a (minimal) rotary component. When pedal 12 is not operated, input rod 18 may be present in an initial position.

Input rod 10 and output rod 18 are not restricted to implementations in the form of rods. Instead, input rod 10 and output rod 18 may also have a form that does not resemble a rod, especially a shape having at least one cavity formed therein. Here, the terms "input rod" and "output rod" are used because they are commonly employed even if such components have a form that differs from the rod form. Thus, all types of input pistons and output pistons are usable as components 10 and 18 for the rotation-translation converter described in this text.

Ball and socket joints, which translate the rotary motion of pedal 12 into the translatory motion of output rod 18, may be disposed at ends P1 and P2 of input rod 10. Since the rotation-translation converter able to be used together with sensor device 8 is not limited to a particular design of the translation components for translating the rotary motion of pedal 12 into the translatory motion of output rod 18, the ball-and-socket joints usable at ends P1 and/or P2 are not discussed here in greater detail.

Using the rotation-translation converter made up at least of input rod 10 and output rod 18, an actuating force Fb applied by a user when operating the pedal is able to be at least partially converted into an axially directed force. For example, the axially directed force may be employed to adjust a piston to form a piston-cylinder unit, such as a brake master cylinder, in particular. However, the rotation-translation converter described here is not restricted to this particular kind of use of the axially oriented force able to be supplied by means of output rod 18.

The rotation-translation converter may additionally include an external force device, by which another force component is able to be provided, in addition to the translated component of actuating force Fb, as part of total force Fg for adjusting output rod 18. In the exemplary embodiment shown, the rotation-translation converter includes a (schematically represented) brake booster 24, with whose aid a boost force as additional component of total force Fg is able to be exerted on output rod 18, in addition to translated actuating force Fb. Brake booster 24, for example, may be implemented as electromechanical brake booster and/or as hydraulic brake booster, especially as continually controllable/regulatable brake booster. The technology according to the present invention described in the further text is not restricted to a particular type of brake booster 24. Instead of brake booster 24, other models of the external force device are able to be integrated into the rotation-translation converter together with sensor device 8.

Brake booster 24 may be connected to output rod 18 via a servo piston and/or via an elastic element such as a reaction disk, in particular. A position of the servo piston used may be variable in relation to input rod 10, by a differential travel Δs. Since the rotation-translation converter is not limited to a particular placement of the external force device on output rod 18, no further details are provided in this regard.

Frequently, it is advantageous to be able to determine information about an operation of pedal 12 by a user. In this case, for example, brake booster 24 employed as external force device is able to be controlled in such a way that the boost force supplied by brake booster 24 is a function of actuating force Fb and/or a function of a displacement travel/actuating travel of input rod 10 (such as variable sx and/or sy discussed later on in the text). In this way, actuating force Fb to be exerted by the driver in order to operate the vehicle component that is actuable via the pedal and the rotation-translation converter, e.g., to operate a hydraulic brake system, in particular, is able to be reduced.

To ensure that this is the case, sensor device 8 is designed to determine at least one variable regarding a position and/or a change in position of input rod 10 set into rotary motion, in relation to a predefined spatial direction. The specified spatial direction preferably is center longitudinal axis 22 of output rod 18, especially center longitudinal axis 22 of output rod 18 in its initial position. However, the implementation of the sensor device is not limited to this example as far as the specified spatial direction is concerned.

The at least one variable may be at least one variable regarding a distance, a change in distance, an orientation and/or a change in orientation of input rod 10 set into rotary motion, in relation to the predefined spatial direction. One particularly uncomplicated option for determining such a quantity will be elucidated in the following text.

As schematically illustrated in FIG. 1, a point P of input rod 10, which is set apart from second end P2, or a corresponding section of input rod 10 moves along a curve about a predefined pivot point, e.g., about second end P2, in the rotary motion represented by arrow 14. In the rotary motion, point P thus is shifted by a first location difference sx which is oriented parallel to center longitudinal axis 22 of output rod 18, and by a second location difference sy which is oriented perpendicularly to center longitudinal axis 22 of output rod 18. In one preferred specific embodiment, the connection between input rod 10 and output rod 18 is developed in such a way that the movement of point P (virtually) corresponds to a circular path about second end P2. However, the use of sensor device 8 described below is not restricted to this particular embodiment.

Sensor device 8 from FIG. 1 is designed to determine at least one variable regarding a distance and/or a change in distance of at least one point P of input rod 10 in relation to center longitudinal axis 22 of output rod 18, e.g., a second location difference sy, as the at least one variable regarding the position and/or the change in position of moved input rod 10 in relation to the predefined spatial direction. Sensor device 8 preferably is configured to determine a field quantity of a distance-dependent reciprocal action as the at least one variable. In particular, it is possible to determine at least one magnetic field intensity and/or electrical field intensity with the aid sensor device 8.

For instance, this is able to be realized using a Hall-effect sensor disposed in non-displaceable manner inside the sensor device, which Hall-effect sensor is designed to measure a field intensity of a magnetic field of a magnetic component disposed at the at least one point P. For this purpose, for instance, at least one part of input rod 10 is magnetizable with the aid of an easily executable and cost-effective magnetization method. Such a design of sensor device 8 having only the single Hall-effect sensor is also suitable for a relatively small detectable measuring range of the utilized Hall-effect sensor of less than 10 mm, e.g., in a measuring range of approximately 5 mm, in order to reliably determine the at least one quantity. Despite the relatively large adjustment travel of input rod 10, which is carried along by pedal 12, the relatively small location difference sy of point P usually lies within a detectable measuring range of the Hall-effect sensor of less than 10 mm.

This constitutes an advantage in comparison to a conventional measurement of a pedal operation, in which information about the operation of pedal 12 is obtained by measuring the adjustment travel of output rod 18 along its center longitudinal axis 22. In a forceful operation of pedal 12, the adjustment travel of output rod 18 along center longitudinal axis 22 normally lies within a control range/value range of at least 10 mm, e.g., within a control range/value range of 48 mm. However, such a large control range/value range cannot be, or can barely be, measured by means of a single Hall-effect sensor and a magnet having a reasonable space requirement. As a result, sensor device 8 is able to be realized in a more cost-effective manner than a conventional pedal sensor device.

However, sensor device 8 is not restricted to having a magnetic sensor such as a Hall-effect sensor, in particular. For instance, it is also possible to use a detector to determine an impingement position of a light beam that is reflected at the at least one point P. Furthermore, sensor device 28 may also include at least one capacitor, which determines a capacitance between an electrode surface disposed on input rod 10, and an electrode surface which is mounted so as to be non-displaceable.

With the aid of a suitable placement of input rod 10 on pedal 12, or by a preferred selection of the at least one point P, it is possible to ensure an unambiguous relationship between the distance of the at least one point P from the specified spatial direction and the position of pedal 12, or of actuating force Fb applied to pedal 12. In this case, a displacement of pedal 12 in a direction of movement exclusively causes an increase, or exclusively causes a decrease, in the distance between the at least one point P and the specified spatial direction. If no clear relationship exists, then an increase or decrease in the distance, in an algebraic sign of the change in distance, an increase or decrease in the determined field intensity, and/or an algebraic sign of a change in the determined field intensity are/is able to be determined with the aid of sensor device 8 and analyzed.

The at least one quantity ascertained by sensor device 8 regarding the position and/or the change in position of input rod 10 set into rotary motion may then be output as information to an evaluation device 30, via a sensor signal 28. Evaluation device 30 preferably is set up to use the at least one quantity to specify a setpoint function mode of at least one component of the device actuable by pedal 12, taking sensor signal 28 into account. In one advantageous specific embodiment, a setpoint boost force of brake booster 24 is specifiable with the aid of evaluation device 30. Brake booster 24 may then be controlled via a control signal 32 while taking the specified setpoint boost force into account.

It is pointed out here that the afore-described technology according to the present invention does not require a mobile sensor element. As a result, the technology according to the present invention also represents a cost-effective and easily implementable alternative to measuring the differential travel, which measurement is frequently used in the operation of a brake booster in a brake system.

Figure 2:
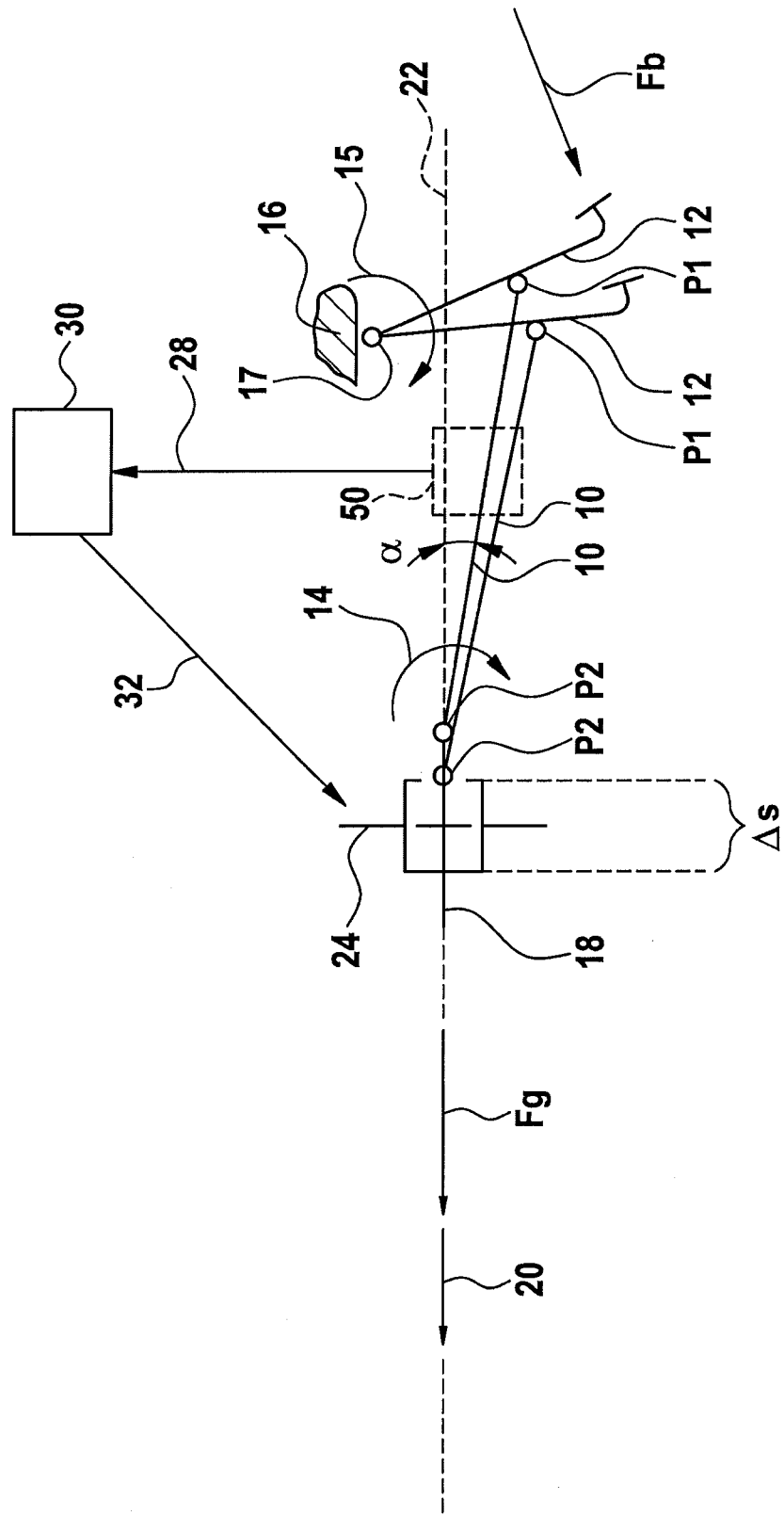
FIG. 2 shows a schematic representation of a second specific embodiment of the sensor device.

FIG. 2 shows a schematic representation of a second specific embodiment of the sensor device.

The rotation-translation converter shown in FIG. 2 includes the already described components 10, 18 and 24. A repeat description of components 10, 18 and 24 is thus dispensed with in this case.

In contrast to the afore-described development, sensor device 50 of FIG. 2 is set up to determine an angle $\alpha$ as the variable regarding the orientation of the input rod, this angle representing the angle at which input rod 10 is oriented in relation to center longitudinal axis 22 of output rod 18. If located at end P2, for example, sensor device 50 is able to perform a direct angle measurement of angle $\alpha$.

In the same way, sensor device 50 may be set up for an indirect angle measurement of angle $\alpha$. This has the advantage that in this case sensor device 50 need not satisfy the requirements arising in the case of a sensor which is able to be carried along, so that the sensor device is able to be produced more cost-effectively. Sensor device 50 preferably is situated outside a plane delineated by rods 10 and 18 (see dashed lines). Sensor device 50 may therefore be situated in close proximity to input rod 50, without sensor device 50 restricting the freedom of movement of input rod 10. Sensor device 50 advantageously includes an AMR sensor utilizing the AMR effect (anisotropic magnetoresistive effect) and/or a GMR sensor utilizing the GMR effect (giant magnetoresistance effect). The use of such a sensor makes it possible to measure angle $\alpha$ between input rod 10 and center longitudinal axis 22 of output rod 18 in an uncomplicated and reliable manner. For example, it is possible to mount a magnet on input rod 10 for this purpose. In one cost-effective alternative, input rod 10 is at least partially magnetized. In this case, sensor device 50 may be used to determine an angular change of input rod 10 relative to the stationary axis without any or with only negligible error deviations, the angular change corresponding to the movement range of pedal 12.

As an alternative to described sensor device 50 having an AMR sensor and/or a GMR sensor, it is also possible to use two travel-measuring elements at two different points of input rod 10 in order to determine the position of input rod 10 in space.

The at least one quantity determined by sensor device 50 is subsequently made available as information to an evaluation device 30, via sensor signal 28. Evaluation device 30 may be designed in particular to specify a quantity regarding the translational motion of output rod 18, taking the received information into account. As a result, devices 50 and 30 may also perform the function of a classic displacement sensor for specifying an adjustment travel of output rod 18 or its rate of adjustment. The evaluation methods for specifying the adjustment travel of output rod 18 are able to be stored as software in evaluation device 30, which is implemented as electronic control unit, for example, and processed in cyclical manner. As an alternative, evaluation device 30 may store characteristic curves which include a suitable conversion rule for converting the information into the adjustment travel of output rod 18.

Thus, a travel measurement via an angle measurement is realized in the specific development shown, for which sensor device 50 needs to detect no more than relatively small angular changes. As a result, the angle measurement to be performed is considerably less complex than measuring the adjustment travel of output rod 18 set into translatory motion. The measurement of the adjustment travel of output rod 18 as it is frequently implemented in the conventional manner requires a detectable measuring range of the adjustment travel of approximately 40 mm, e.g., 48 mm. Such a sensor requirement is impossible to satisfy when using a cost-effective Hall-effect sensor.

Figure 3:
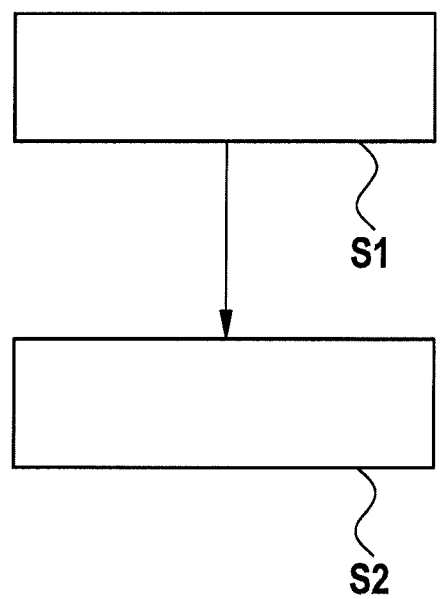
FIG. 3 shows a flow chart to illustrate the method for providing information regarding a pedal operation.

FIG. 3 shows a flow chart to illustrate the method for providing information about an operation of a pedal.

In a method step S1, at least one actuating variable regarding an operation of the pedal by a user is determined with the aid of a device that is actuable using the pedal. When determining the at least one actuating variable, at least one variable regarding a position and/or a change in position of an input rod in relation to a specified spatial direction is determined, the input rod being disposed on the pedal and able to be set into at least a rotary motion by operating the pedal. In particular, it is possible to determine the at least one variable regarding the position and/or the change in position of the input rod in relation to a center longitudinal axis of an output rod present in its initial position and set into at least a translatory motion using the input rod set into rotary motion, as the predefined spatial direction. Toward this end, at least one field intensity, a change in the field intensity, an orientation and/or a change in orientation of an electrical and/or magnetic field of an electrically and/or magnetically interacting component disposed on and/or in the input rod may be ascertained as the at least one variable. Pertinent examples are discussed above in order to illustrate the advantageous sensor device.

In a further method step S2, the information corresponding to the at least one determined actuating variable is output. As a result, the advantages already mentioned earlier are able to be realized by the method as well.

What is claimed is:

1. A sensor device for a pedal, comprising:
 a sensor arrangement configured to determine at least one actuating variable regarding an operation of the pedal by a user of a device which is actuable using the pedal, and to output information corresponding to the at least one ascertained actuating variable, to determine, as the at least one actuating variable, at least one variable regarding at least one of a position and a change in position of an input rod disposed at the pedal, which input rod is settable into at least a rotary motion by operating the pedal, in relation to a specified spatial direction;
 wherein the specified spatial direction is a center longitudinal axis of an output rod present in its initial position, which is joined to the input rod so that the output rod is settable into at least a translatory motion using the input rod set into the rotary motion, and
 wherein the sensor device is configured to specify as at least part of the output information, at least one of: a distance of at least one point of the input rod perpendicularly to the center longitudinal axis of the output rod; a quantity of change in distance of the at least one point of the input rod perpendicularly to the center longitudinal axis of the output rod; an angle representing an orientation of the input rod in relation to the center longitudinal axis of the output rod; and an angle representing a change in orientation of the input rod in relation to the center longitudinal axis of the output rod.

2. The sensor device as recited in claim 1, wherein the at least one variable is determined by the sensor device based on at least one of a field intensity, a change in field intensity, an orientation, a change in orientation of an electric, or a magnetic field of at least one of an electrically and a magnetically interacting component disposed at least one of on and in the input rod.

3. The sensor device as recited in claim 2, wherein the sensor device includes a Hall-effect sensor, which is configured to determine at least one of a magnetic field intensity and a change in field intensity of a magnetic field of a magnet disposed on the input rod as interacting component.

4. The sensor device as recited in claim 2, wherein the sensor device includes at least one of a GMR sensor and an AMR sensor, which is configured to determine at least one of an orientation and a change in orientation of a magnetic field of a magnet disposed on the input rod as the interacting component.

5. A rotation-translation converter, comprising:
 an input rod disposed on a pedal such that when the pedal is operated, the input rod is settable into at least a rotary motion;
 an output rod joined to the input rod and able to be disposed on a device which is actuable using the pedal, so that the output rod is settable into at least a translatory motion using the input rod set into the rotary motion, such that a force is able to be transmitted to at least one component of the device via the output rod set into the translatory motion; and
 a sensor device configured to determine at least one actuating variable regarding an operation of the pedal by a user of a device which is actuable using the pedal, and to output information corresponding to the at least one ascertained actuating variable, the sensor device being configured to determine, as the at least one actuating variable, at least one variable regarding at least one of a position and a change in position of the input rod disposed at the pedal, which input rod is settable into at least a rotary motion by operating the pedal, in relation to a specified spatial direction;
 wherein the specified spatial direction is a center longitudinal axis of the output rod present in its initial position, and
 wherein the sensor device is configured to specify as at least part of the output information, at least one of: a distance of at least one point of the input rod perpendicularly to the center longitudinal axis of the output rod; a quantity of change in distance of the at least one point of the input rod perpendicularly to the center longitudinal axis of the output rod; an angle representing an orientation of the input rod in relation to the center longitudinal axis of the output rod; and an angle representing a change in orientation of the input rod in relation to the center longitudinal axis of the output rod.

6. The rotation-translation converter as recited in claim 5, wherein the rotation-translation converter includes an evaluation device configured to provide a setpoint function mode of at least one component of the device actuable using the pedal, taking the information output by the sensor device into account, and to provide a control signal which corresponds to the specified setpoint function mode.

7. The rotation-translation converter as recited in claim 5, wherein the input rod is magnetized.

8. A brake system, comprising:
a sensor device configured to determine at least one actuating variable regarding an operation of a pedal by a user of a device which is actuable using the pedal, and to output information corresponding to the at least one ascertained actuating variable, the sensor device being configured to determine, as the at least one actuating variable, at least one variable regarding at least one of a position and a change in position of an input rod disposed at the pedal, which input rod is settable into at least a rotary motion by operating the pedal, in relation to a specified spatial direction;
wherein the specified spatial direction is a center longitudinal axis of an output rod present in its initial position, which is joined to the input rod so that the output rod is settable into at least a translatory motion using the input rod set into the rotary motion, and
wherein the sensor device is configured to specify as at least part of the output information, at least one of: a distance of at least one point of the input rod perpendicularly to the center longitudinal axis of the output rod; a quantity of change in distance of the at least one point of the input rod perpendicularly to the center longitudinal axis of the output rod; an angle representing an orientation of the input rod in relation to the center longitudinal axis of the output rod; and an angle representing a change in orientation of the input rod in relation to the center longitudinal axis of the output rod.

9. A brake system, comprising:
a rotation-translation converter, including an input rod disposed on a pedal such that when the pedal is operated, the input rod is settable into at least a rotary motion, an output rod joined to the input rod and able to be disposed on a device which is actuable using the pedal, so that the output rod is settable into at least a translatory motion using the input rod set into the rotary motion, such that a force is able to be transmitted to at least one component of the device via the output rod set into the translatory motion, and a sensor device configured to determine at least one actuating variable regarding an operation of the pedal by a user of a device which is actuable using the pedal, and to output information corresponding to the at least one ascertained actuating variable, the sensor device being configured to determine, as the at least one actuating variable, at least one variable regarding at least one of a position and a change in position of an input rod disposed at the pedal, which input rod is settable into at least a rotary motion by operating the pedal, in relation to a specified spatial direction;
wherein the specified spatial direction is a center longitudinal axis of an output rod present in its initial position, which is joined to the input rod so that the output rod is settable into at least a translatory motion using the input rod set into the rotary motion, and
wherein the sensor device is configured to specify as at least part of the output information, at least one of: a distance of at least one point of the input rod perpendicularly to the center longitudinal axis of the output rod; a quantity of change in distance of the at least one point of the input rod perpendicularly to the center longitudinal axis of the output rod; an angle representing an orientation of the input rod in relation to the center longitudinal axis of the output rod; and an angle representing a change in orientation of the input rod in relation to the center longitudinal axis of the output rod.

10. A method for providing information regarding an operation of a pedal, comprising:
determining at least one actuating variable regarding an operation of the pedal by a user of a device which is actuable using the pedal; and
outputting, by a sensor device, the information corresponding to the at least one determined actuating variable;
wherein when determining the at least one actuating variable, at least one variable regarding at least one of a position and a change in position of an input rod disposed at the pedal and set into at least a rotary motion by operating the pedal, in relation to a specified spatial direction, is determined,
wherein the specified spatial direction is a center longitudinal axis of an output rod present in its initial position, which is joined to the input rod so that the output rod is settable into at least a translatory motion using the input rod set into the rotary motion, and
wherein the sensor device is configured to specify as at least part of the output information, at least one of: a distance of at least one point of the input rod perpendicularly to the center longitudinal axis of the output rod; a quantity of change in distance of the at least one point of the input rod perpendicularly to the center longitudinal axis of the output rod; an angle representing an orientation of the input rod in relation to the center longitudinal axis of the output rod; and an angle representing a change in orientation of the input rod in relation to the center longitudinal axis of the output rod.

11. The method as recited in claim 10, wherein the at least one variable is determined by a sensor device based on at least one of a field intensity, a change in the field intensity, an orientation, a change in orientation of at least one of an electrical and magnetic field of at least one of an electrically and magnetically interacting component disposed at least one of on and in the input rod.

* * * * *